May 4, 1965  E. J. CATOR  3,181,895

QUICK-CONNECT MAGNETIC COUPLINGS

Filed Sept. 27, 1960

INVENTOR.
EDWARD J. CATOR
BY
*Fay & Fay*
ATTORNEYS

United States Patent Office 3,181,895
Patented May 4, 1965

3,181,895
QUICK-CONNECT MAGNETIC COUPLINGS
Edward J. Cator, Rochester, N.Y., assignor to Crawford Fitting Company, Cleveland, Ohio, a corporation of Ohio
Filed Sept. 27, 1960, Ser. No. 58,742
2 Claims. (Cl. 285—1)

This invention relates to magnetic quick-connect couplings.

The application of pneumatic controls in process automation is growing rapidly. However, the realization of the full potential of these controls awaits the development of inexpensive quick-connect couplings for the instrument air. My invention fulfills this need.

Heretofore, practically all designs of couplings embody the principle of locking detents actuated by springs and sleeves. Where magnets have been employed, they have replaced springs leaving unaffected the essential movable parts—the locking detents and sleeves.

According to my invention, quick-content couplings can be produced inexpensively by means of two ring-shaped magnets firmly secured to the parts of the coupling. These magnets may be permanent magnets or electromagnets. They develop sufficient magnetic force to hold the coupling parts together against the force of the line pressure—3 to 15 p.s. instrument air—tending to separate these parts.

My invention possesses certain highly desirable attributes. The couplings embodying my invention are extremely simple because they require fewer parts and do away with all moving parts. The magnitude of the holding force of the ring magnets can readily be controlled within the desired range and tolerance by controlling their size and flux density. My invention can advantageously utilize permanent magnets made of a ceramic material which permit the creation of magnetic fields of opposite polarity at short distances within the material so that the ring-shaped magnets can be provided with a plurality of magnetic poles on both flat surfaces.

Moreover, the quick-connect couplings of my invention constitute safety devices when used in conjunction with measuring and recording devices. Should excessive pressure in the line occur, creating a separating force upon the coupling greater than the holding force of the magnets, the parts of the coupling will automatically be disconnected.

The foregoing, together with others which will become apparent as the description of my invention proceeds, may be taken as the objects of my invention.

In the drawings forming a part of this specification:

Figure 1:
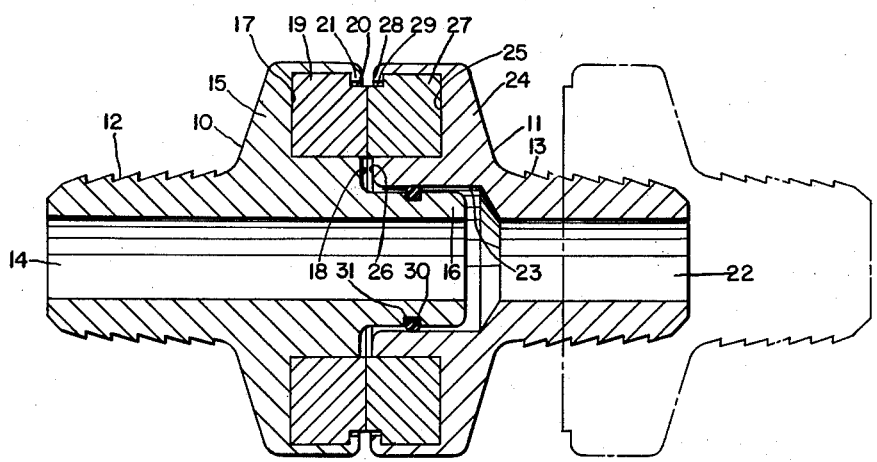
FIG. 1 is a longitudinal section of a coupling embodying my invention.

My coupling, illustrated in FIG. 1 of the drawing, comprises a male member 10 and a female member 11 provided with hose rings 12 and 13. The male member 10, which is tubular, has an axial bore 14 extending through it. Intermediate its ends the male member has an enlarged annular portion 15 which provides a projection 16 adapted to be received by the female member 11. The projection 16 is provided with a circumferential groove 30 which receives an O-ring 31. The O-ring 31 is of such diameter that it snugly engages the cylindrical bore 23. Within the enlarged portion 15 is an annular, substantially rectangular recess 17 which opens through the radial face 18 of the enlarged portion.

Figure 2:
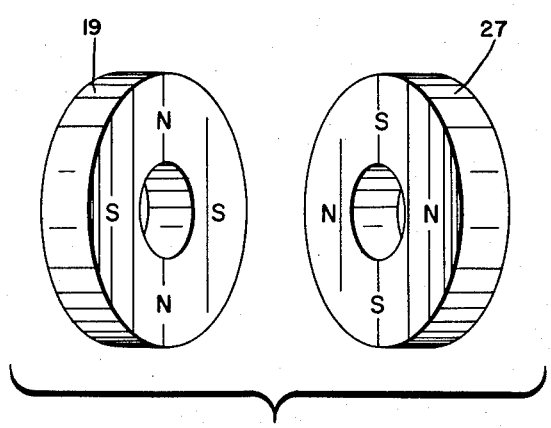
FIG. 2 is a perspective view showing the ring magnets of my invention and the opposed polarity of adjacent forces of the magnets.

A ring-shaped magnet 19, see FIG. 2, is inserted in the recess 17. The magnet 19 may be a permanent magnet or an electromagnet. Where a permanent magnet is used, a ceramic magnet is preferred. The outer face of the magnet, which is preferably flat, has magnetic fields of opposite polarity at short distances from each other. As shown, these fields have an angular displacement of 90° from each other. The outer corner of the magnet 19 is rabbeted as shown at 20.

The magnet 19 is inserted in recess 17. Thereafter, the part of the enlarged portion 15 which overlies the rabbet 20 is flanged inwardly as indicated at 21 to lie in the rabbet in engagement with the magnet and firmly secure it in the recess.

The female member 11 has an axial bore 22 which communicates with a bore 23 of larger diameter adapted to receive the projecting portion 16 of the male member 10. At the bore 23 the female member has an enlarged annular portion 24, preferably similar to the enlarged portion 15. An annular, substantially rectangular recess 25 is formed in the enlarged portion 24 which opens through the radial face 26 of said portions.

A ring-shaped magnet 27 is inserted in the recess 25 and firmly retained therein by a flange 28 formed on the enlarged portion 24 and bent into a rabbeted portion 29 in the outer corner of the magnet. The ring-magnet 27 is similar in size and shape to the ring-magnet 19 and the outer face thereof is similarly provided with magnetic fields of opposite polarity which are displaced 90° from each other. These magnetic fields, however, are of opposite polarity to the similarly disposed magnetic fields of the ring magnet 19.

The male and female members are simply and quickly coupled by assembling them as shown in FIG. 1 of the drawing. The outer faces of the ring magnets 19 and 27 are in contact and the respectively opposed magnetic fields of the magnets exert a force of attraction which secures the male and female members together against the force of the line pressure. In the event, however, that a separating force should occur upon the coupling which is greater than the holding force between the magnets, uncoupling will automatically take place.

Uncoupling of the male and female members proceeds just as simply and quickly. It is only necessary to give one of the members a quarter turn relative to the other member. By so doing, magnetic fields of like polarity are aligned, setting up a repelling force between the magnets of sufficient magnitude to separate the male and female members. Coupling and uncoupling are thus accomplished without the use of movable parts, such as detents and sleeves.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A coupling for use in a pressure line comprising male and female members, axial faces on each of said members, said male member having a reduced cylindrical portion projecting from said axial face, said reduced cylindrical portion being received in a co-operating bore in said female member when said members are coupled, each of said axial faces having a recess therein, a ring magnet in each of said recesses, means to secure said magnets in said recesses, said magnets being engaged each with the other when said male and female members are brought into coupling relationship, each of said magnets having a plurality of magnetic fields with the opposed magnetic fields of the engageable portions being of opposite polarity when said members are coupled and freely rotatable to a position of like polarity to be easily uncoupled, said magnets exerting a predetermined holding force to keep the members in coupled relationship with an area on the end of said cylindrical portion exposed to the line pressure serving to exert a force to uncouple said members when the line pressure exceeds the predetermined holding force of said magnets.

2. A coupling as set forth in claim 1 wherein the outer corners of said ring magnets are rabbeted and the margins of the outer portions of said members are bent into said rabbeted portion to secure said magnets.

References Cited by the Examiner

UNITED STATES PATENTS

| | | | |
|---|---|---|---|
| 144,663 | 11/73 | Demarest | 285—347 |
| 1,047,063 | 12/12 | Irving et al. | 285—347 |
| 2,240,035 | 4/41 | Catherall | 24—201.2 |
| 2,536,702 | 1/51 | Scheiwer | 285—1 |
| 2,678,228 | 5/54 | Gerhardt | 285—9 |
| 2,786,698 | 3/57 | Bard | 285—347 |
| 2,793,057 | 5/57 | McGugin | 285—304 |
| 2,860,893 | 11/58 | Clark | 285—1 |
| 2,953,970 | 9/60 | Maynard | 285—9 |

FOREIGN PATENTS

| | | |
|---|---|---|
| 492,612 | 3/30 | Germany. |

CARL W. TOMLIN, *Primary Examiner.*